United States Patent
Bastoreala et al.

(10) Patent No.: US 11,448,568 B2
(45) Date of Patent: Sep. 20, 2022

(54) METHOD OF DETERMINING THE EVALUATION TIME FOR A DIAGNOSIS

(71) Applicant: Robert Bosch GmbH, Stuttgart (DE)

(72) Inventors: Arthur Bastoreala, Remseck Am Neckar (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 16/871,274

(22) Filed: May 11, 2020

(65) Prior Publication Data
US 2020/0363294 A1   Nov. 19, 2020

(30) Foreign Application Priority Data
May 13, 2019   (DE) .................... 10 2019 206 879.0

(51) Int. Cl.
*G01M 15/10*   (2006.01)

(52) U.S. Cl.
CPC ................ *G01M 15/102* (2013.01)

(58) Field of Classification Search
CPC .................................................. G01M 15/102
See application file for complete search history.

(56) References Cited

U.S. PATENT DOCUMENTS

2001/0037642 A1* 11/2001 Uchida ................. B60W 20/00 903/903
2021/0095611 A1*  4/2021 Nakamura .......... F02D 41/1439

FOREIGN PATENT DOCUMENTS

| DE | 102011111354 A1 | | 3/2012 | |
|----|-----------------|---|--------|---|
| DE | 102013206431 A1 | * | 10/2014 | ............. F01N 11/00 |
| DE | 102013206431 A1 | | 10/2014 | |
| DE | 102011003106 A1 | | 7/2017 | |
| JP | 2011074926 A | * | 4/2011 | |

OTHER PUBLICATIONS

Tronconi et al., "Unsteady Analysis of NO Reduction over Selective Catalytic Reduction-DE-NOx Monolith Catalysts", Ind. ENg. Chem. Res, vol. 37, 1998, pp. 2341-2349.

* cited by examiner

*Primary Examiner* — Kevin A Lathers
(74) *Attorney, Agent, or Firm* — Michael Best & Friedrich LLP

(57) ABSTRACT

A method of determining a suitable evaluation time for a diagnosis method for the diagnosis of a component, wherein the diagnosis method is based on at least one measured sensor value and at least one modeled comparative value ($c_{OBDsim}$), wherein the method comprises: replacing, in the diagnosis method, at least one measured sensor value with a calculated model value ($c^{BPU}$), where the model (20) for the calculation of the model value is a model of the component in a state that is to be recognized by the diagnosis method; executing (102, 104, 106) the diagnosis method with the calculated model value; obtaining a result value ($a_{OBDsim}$) of the diagnosis method; repeating the preceding steps until the result value attains a defined threshold value; and fixing the suitable evaluation time in the diagnosis method as the time after which the result value has attained the threshold value.

9 Claims, 4 Drawing Sheets

METHOD OF DETERMINING THE EVALUATION TIME FOR A DIAGNOSIS

BACKGROUND OF THE INVENTION

The present invention relates to a method of determining a suitable evaluation time for a diagnosis method in a component, and to a computation unit and a computer program for performance thereof.

In motor vehicles, many systems are monitored to ensure correct function and compliance with limits, for example all systems relevant to exhaust gas, especially the catalysts. According to the legislation, strict compliance with different limits, frequently specified as emissions limits, is then necessary.

Since faulty catalysts can no longer achieve adequate conversion of pollutants, for example, the state of an SCR (selective catalytic reduction) catalyst for reduction of nitrogen oxides ($NO_x$) in the exhaust gas in operation is monitored continuously. The nitrogen oxides here include nitrogen monoxide, NO, and nitrogen dioxide, $NO_2$. The basic principle of the SCR catalyst is that nitrogen oxide molecules are reduced at the catalyst surface in the presence of ammonia ($NH_3$) as reducing agent to elemental nitrogen. The reducing agent is typically provided in the form of an $NH_3$-releasing urea/water solution, which is provided by a controlled dosage device upstream of the SCR catalyst. By sensor measurements of the nitrogen oxide concentrations upstream and downstream of the catalyst, it is possible to monitor the efficiency and hence, indirectly, the current state of the catalyst, and, in the event of recognition of aging or damage, the user can be prompted by warning lights to look for a garage to change it.

These and other diagnosis methods may each be performed over a particular monitoring period which is determined by averaging an appropriate criterion, for example the efficiency of the catalyst. This monitoring period can be defined, for example, as a fixed time window, or it is possible to wait for particular conditions to be attained, for example a particular mass of nitrogen oxides upstream of the catalyst, which is determined via an integral of the nitrogen oxide values. An average or integral serves here to filter short-lived inaccuracies or perturbations in the diagnosis and hence to achieve a robust monitoring result.

In further diagnosis methods, a parameter or a diagnosis is "taught in" over a particular period of time, i.e. the diagnosis method becomes more exact or better with increasing time, for example through feedback. The suitable monitoring feature is thus shaped only over a certain period of time. In such methods, however, the problem is that the suitable evaluation time is difficult to determine. If the diagnosis is evaluated too early, the corresponding monitoring criterion has possibly not yet developed sufficiently, i.e. has not yet been taught in. If the diagnosis is evaluated too late, there is a reduction in the frequency of diagnosis. Since there also exist legal requirements, for example the IUMPR (In Use Monitor Performance Ratio), for the frequency of diagnosis, it is desirable to achieve an optimal evaluation time for diagnosis methods where reliable distinction of the respective states to be diagnosed (for example fault in a component) is possible with sufficient frequency of diagnosis. Simple approaches for the evaluation time as described above cannot take account of how the accuracy and evaluability of a diagnosis method change with time, i.e. the juncture from which a "learning" method has a sufficient data basis for the desired parameters.

SUMMARY OF THE INVENTION

What are proposed in accordance with the invention are a method of determining a suitable evaluation time for a diagnosis method for the diagnosis of a component, and a computation unit and a computer program for performance thereof According to the invention, at least one measured sensor value in a diagnosis method is replaced by a calculated model value that models the component to be diagnosed in the state that is to be reliably recognized. Subsequently, the diagnosis method is executed as a simulation with the calculated model value. A result value from the diagnosis, for example a manipulated variable, an integral or an average that is typically evaluated in the diagnosis, is then checked and the simulated method is conducted until the result value attains a given threshold value. The suitable evaluation time for the diagnosis method is then fixed as the time at which the result value attains the threshold value. It should be pointed out that time and duration are equivalent here. By determining a time, a duration (up to that time) is at the same time also determined. The suitable evaluation period for the diagnosis method is then fixed as the duration after which the result value has attained the threshold value. In this way, the diagnosis evaluation can be optimized in relation to frequency and discrimination of the diagnosis, so as also to result in more accurate diagnoses.

Preference is given to performing the diagnosis method for the component and to triggering the evaluation thereof at the time thus determined or after the suitable duration thus determined. In this way, the diagnosis can be performed under current operating conditions and the evaluation can be triggered as soon as a sufficient data basis is available for the interpretation.

In an illustrative embodiment, the method may also comprise the fixing of an initial value for the result value of the diagnosis method, the performing of the diagnosis method using a model in which the result value is fixed to the initial value, to obtain parameters from an initialization model, and the using of parameters from the initialization model for the calculation of the modeled comparative value and/or the calculated model value.

The component to be diagnosed may, for example, be an SCR catalyst. In this case, the diagnosis method may comprise, for example, the following steps: calculating at least one modeled comparative value for a given state of a model catalyst; detecting at least one measured sensor value in the exhaust gas beyond the catalyst; forming a difference value from the at least one measured sensor value and the at least one modeled comparative value, and forming the result value as an integrated value from the integral of multiple different values over a predetermined period of time. By such a diagnosis method, it is possible to evaluate the present difference between model and measurement data over a particular period of time, it being possible by means of a method according to the invention to fix the optimized length of the duration of a monitoring phase to be evaluated in each case.

In a further embodiment, the diagnosis method in an SCR catalyst may comprise the following steps: calculating at least one modeled comparative value for a given state of a model catalyst; detecting at least one measured sensor value in the exhaust gas beyond the catalyst; forming a difference value from the at least one measured sensor value and the at least one modeled comparative value, amplifying the difference value by means of a state observer; forming an integrated value from the integral of multiple difference values over a predetermined period of time to obtain a result value; and feeding the result value back into the model of the model catalyst to correct the modeled comparative value. By means of the observer utilized in this method, it is possible to better adapt the model to the measurement values in the diagnosis. By a method according to the present invention, it is then possible to determine the optimal duration for obtaining diagnosis results that are robust by virtue of a sufficiently corrected model. It will be apparent that the forming of an integrated value will in practice be implemented as a summation.

In such embodiments, the measured sensor values and calculated model values may, for example, be one of the following: a nitrogen oxide value, an ammonia value, or a combined nitrogen oxide/ammonia value, where the values in each case may specify, for example, a concentration or a mass flow rate of an exhaust gas constituent.

A computation unit of the invention, for example a control device of a motor vehicle, is set up, especially by programming, to perform a method of the invention.

The implementation of a method of the invention in the form of a computer program or computer program product with program code for performance of all method steps is also advantageous since this incurs particularly low costs, especially when a control device executing the method is also utilized for further functions and is therefore present in any case. Suitable data carriers for provision of the computer program are especially magnetic, optical and electrical storage means, for example hard drives, flash drives, EEPROMs, DVDs and the like. It is also possible to download a program via computer networks (internet, intranet etc.).

BRIEF DESCRIPTION OF THE DRAWINGS

Further advantages and configurations of the invention will be apparent from the description and the appended drawing.

The invention is shown in schematic form in the drawing with reference to working examples and is described hereinafter with reference to the drawing.

DETAILED DESCRIPTION

Embodiments of the invention are especially suitable for diagnosis methods that are to proceed over a particular period of time, and which draw a conclusion as to the state of the component diagnosed, for example a catalyst, on the basis of measured values and model values in combination. Embodiments of the invention are preferentially suitable for "learning" diagnosis methods, i.e. those in which the relevant monitoring criteria form over a certain time, such that evaluation of the diagnosis is possible or advisable only after a particular period of time.

A diagnosis method for which the optimal evaluation time is to be found may firstly be considered here, wherein measurements and modeled comparison values are to influence the diagnosis method. On the basis of this diagnosis method, it is then likewise possible to replace the values that are provided as measurements with simulated values. For this purpose, it is possible with preference to utilize a simulation of a component corresponding to the component to be recognized (e.g. faulty catalyst). An examination is subsequently made as to the time from which, or over what duration of an evaluation phase, sufficient diagnosis results are obtained under these conditions. For determination of the time, it is possible to employ threshold values, for example.

More particularly, it is possible to monitor an SCR catalyst on the basis of particular modeled or calculated and measured exhaust gas values. Two such methods are utilized as examples hereinafter in order to describe inventive embodiments of methods of determining an optimal evaluation time by way of example.

Figure 1:
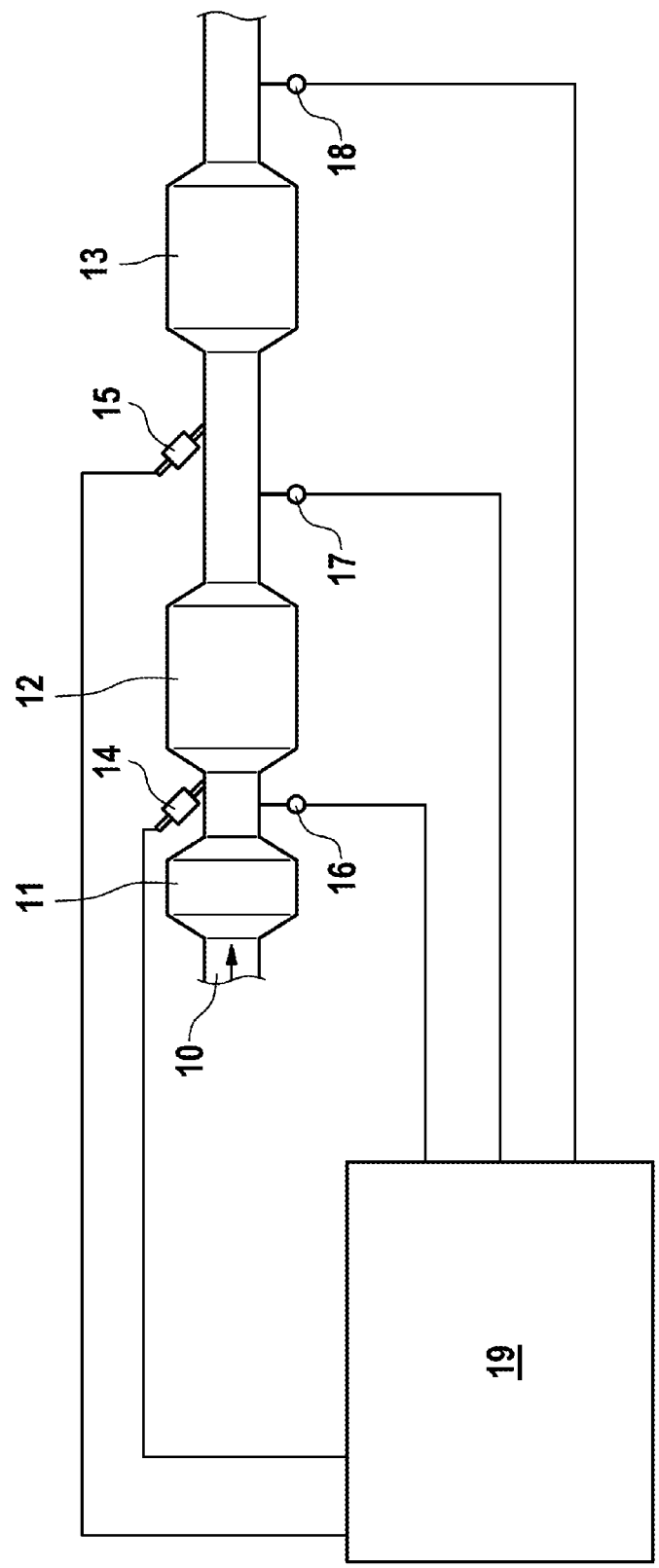
FIG. 1 shows an illustrative catalyst system in an exhaust gas conduit in which a method according to the invention is usable.

In a first illustrative diagnosis method, the state of an SCR catalyst is monitored. Such a catalyst system is shown in FIG. 1. There are provided here, in an exhaust gas conduit, one or more catalyst elements into which an exhaust gas stream 10 from an internal combustion engine is introduced for exhaust gas treatment. The figure firstly shows a diesel oxidation catalyst (DOC) 11 followed downstream by two SCR catalyst elements 12 and 13 that may each also comprise, for example, a particulate filter element with SCR coating (SCRF) 12. Upstream of each SCR catalyst element 12, 13 is disposed a dosage module 14 and 15 for dosed introduction of a urea/water solution into the system. Each dosage module 14, 15 is controlled by a control unit 19, with preferably all modules being actuated by the same unit, for example an engine control device. Moreover, multiple sensors 16, 17 and 18 are fitted, which can measure exhaust gas values at different points in the system.

More particularly, upstream of and/or beyond every catalyst element 11, 12, 13, a nitrogen oxide sensor and/or an ammonia sensor may be fitted, which measures the concentrations and/or conversion rate and/or mass flow rates of the respective constituents in the exhaust gas stream. The sensor may be an $NO_x$ sensor that is cross-sensitive to ammonia ($NH_3$) as well, or it may be a multigas sensor that can give individual output values for $NO_x$ and $NH_3$. In the case of a cross-sensitive $NO_x$ sensor, a combined sensor signal for the nitrogen oxide and ammonia contents beyond the catalyst is thus indeed obtained. It is likewise also possible for multiple individual sensors for $NO_x$ and $NH_3$ to be disposed at the respective points 16, 17, 18 in the exhaust gas stream.

The measurement values from all sensors are passed on to a control unit 19 for processing. It is of course also possible to use further sensors that are not shown here, for example temperature sensors at various points in the system, lambda probes, air mass flow meters inter alia.

In addition, such a catalyst can be theoretically modeled in a particular defined state, for example in what is called a WPA (worst performing acceptable) state that describes a component to be defined as still just being intact, or in a BPU (best performing unacceptable) state, which describes a component to be defined as just being defective. It is also possible with preference to choose an intermediate model between these two BPU and WPA states. The model can then be used, for example, to calculate theoretical concentration values for nitrogen oxides and ammonia beyond the catalyst. Such a method is likewise possible using other exhaust gas values, for example the mass flow rates rather than the concentrations, or can be performed separately in the case of suitable sensors for the $NO_x$ value and/or the $NH_3$ value.

The variance between the modeled and measured concentration values beyond the catalyst can then be quantified by forming a difference. In a further step, this variance can then be corrected using an observer. An observer is understood here to mean a system that uses known input parameters and output parameters from an observed reference system to reconstruct an unmeasurable parameter of the system. For this purpose, the observer models the observed reference system and uses a controller to track the state parameters that are measurable and therefore comparable with the reference system. In the present illustrative diagnosis method, the SCR catalyst constitutes the reference system, and the unmeasurable parameter utilized is what is called the area factor of the catalyst. An area factor is understood to mean a correction factor that represents damage to the SCR catalyst and is proportional to the catalytically active area of the SCR catalyst. An area factor which is used for assessment of the SCR catalyst in an on-board diagnosis (OBD) may, for example, be 1 in the case of a WPA catalyst and have a value close to 0 in the case of a BPU catalyst.

By means of the observer, it is thus effectively possible to form a closed-loop control circuit that corrects the catalyst model used in the diagnosis. For this purpose, the difference between model value and measurement can be correspondingly amplified by the observer, then multiplied by a factor of −1 and supplied to an integrator. The area factor obtained thereby is again supplied to the model and corrects it.

It is then possible to fix a threshold value for the area factor, a value below which indicates, for example, a BPU catalyst or faulty catalyst, or the exceedance of which indicates a WPA catalyst.

Such a diagnosis method for a catalyst with an observer is described in more detail in the applicant's DE 10 2019 206683, "Method of monitoring an SCR catalyst", to which reference is made for further details.

The appropriate time for evaluation is now to be found for such a learning diagnosis method, i.e. the time by which the method has attained sufficient diagnosis accuracy and discrimination between the states to be recognized. In the present example, this may be the time or duration after which the area factor is compared with the diagnosis threshold value as described in order to recognize whether the catalyst has gone below the threshold value and is classified as faulty.

According to the invention, the measurements may be replaced here by further model values. If, as described above, an intermediate catalyst is utilized for the modeling in the diagnostic method, the comparative value used for the determination of the evaluation time may then, for example, be a modeled BPU catalyst. In this way, it is possible to determine the evaluation time from which the method can robustly recognize such a BPU catalyst. The real sensor measurements from the diagnostic method for the exhaust gas parameters beyond the catalyst are thus replaced at least partly by corresponding modeled BPU values and then the whole of the rest of the diagnostic method is run through in simulated form on this basis. Further possible input parameters into both models, as well as predetermined or calculated parameters, may also be measured or retrieved parameters, for example the ammonia concentration dosed into the catalyst system at a particular time on the basis of the actuation of the dosage model, a measured or calculated nitrogen oxide concentration upstream of the catalyst, temperatures in the catalyst, and so forth.

Rather than a threshold value that, in the actual diagnostic method, can state when the threshold to the faulty or intact component has been exceeded, it is then possible to fix a threshold value that states the time from which the diagnosis is meaningful. The time until attainment of this threshold then preferably indicates the earliest optimal evaluation time for the method. A later evaluation time would then likewise be reliable or even more meaningful, but the longer diagnosis phases as already described would reduce the frequency of diagnosis, which is typically undesirable. But in the case of corresponding requirements, for example on the basis of further criteria, it is of course also possible to choose a later diagnosis time; preferably, the threshold value thus found for an evaluable diagnosis serves merely as a necessary minimum prerequisite for evaluation.

It is also possible to conduct multiple simulations of this kind for determination of evaluation times, for example using various replacement models; for instance, in a first simulation, it would be possible to replace the measurement with a modeled BPU catalyst, and in a second simulation the measurement may be replaced by a modeled WPA catalyst. In this way, two different evaluation times are thus obtained when suitable threshold values are fixed, for example for WPA and BPU catalyst. According to other demands on the diagnosis, it is then possible to stipulate that both conditions must be fulfilled as the evaluation time actually utilized for the diagnosis, for example, i.e. that the diagnosis is not evaluated until both (or the later) evaluation time is achieved. Thus, it can be achieved that both states are reliably recognizable in a diagnosis.

The method of determining the evaluation time preferably takes place in parallel to the actual diagnosis method, such that, on attainment of the conditions for the evaluation time, the evaluation of the diagnosis method can be triggered directly. It is thus possible for all current operating conditions also to influence the determination of the evaluation time as desired. Alternatively, the suitable evaluation time can be stored and read out in order to be used later as the period of time for the diagnosis method.

Figure 2:
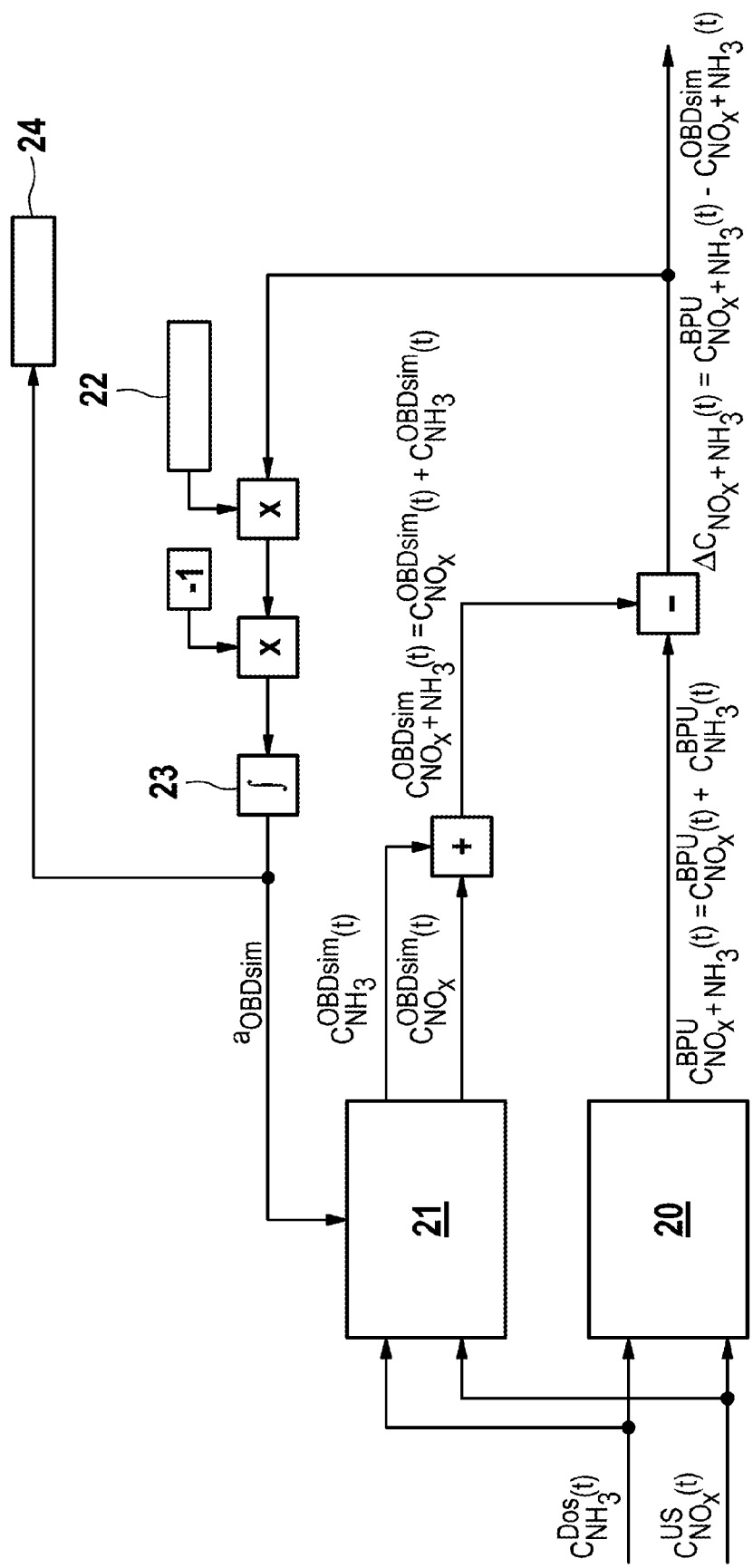
FIG. 2 shows a schematic of the principle of a method in a first embodiment of the invention.

A first illustrative method of determining a preferred evaluation time for a diagnosis, shown in schematic form in FIG. 2, may thus have the following detailed setup:

An ammonia concentration $c_{NH_3}^{Dos}(t)$ dosed into the SCR catalyst is calculated from an actuation of a first dosage module. A nitrogen oxide concentration $c_{NO_X}^{US}(t)$ in the exhaust gas stream upstream of the SCR catalyst (i.e. before entry into the catalyst) can either be measured by means of a first nitrogen oxide sensor or ascertained by means of a model. These parameters are supplied to a reaction kinetics model 21 of the first SCR catalyst, for example to a model 21 of an intermediate catalyst between the WPA and BPU states. The output obtained is simulated values for an ammonia concentration $c_{NH_3}^{OBDsim}(t)$ and for a nitrogen oxide concentration $c_{NO_X}^{OBDsim}(t)$, at time t, which together result in a cumulative signal for the two concentrations:

$$c_{NO_X+NH_3}^{OBDsim}(t) = c_{NO_X}^{OBDsim}(t) + c_{NH_3}^{OBDsim}(t).$$

A second component used, rather than actual sensor measurements as in the diagnosis, may then be a BPU model 20 of the catalyst. This model is also influenced by the ammonia and nitrogen oxide concentrations $c_{NO_X}^{US}(t)$ and $c_{NH_3}^{Dos}(t)$ upstream of the catalyst as starting conditions. The result obtained is then a modeled cumulative value $c_{NO_X+NH_3}^{BPU}(t)$, which corresponds to the sum total of the modeled concentrations $c_{NO_X}^{mess}$ of nitrogen oxides $c_{NO_X}^{BPU}(t)$ and of ammonia $c_{NH_3}^{BPU}(t)$ downstream of the modeled BPU catalyst:

$$c_{NO_X+NH_3}^{BPU}(t) = c_{NO_X}^{BPU}(t) + c_{NO_X+NH_3}^{BPU}(t)$$

This modeled "sensor value" is then compared with the sum total $c_{NO_X+NH_3}^{OBDsim}(t)$ from the first modeled values that come from the intermediate model corrected by the observer. For this purpose, a difference between the values is formed:

$$\Delta c_{NO_X+NH_3}(t) = c_{NO_X+NH_3}^{BPU}(t) - c_{NO_X+NH_3}^{OBDsim}(t)$$

This difference is sent to an observer 22 that generates a corresponding amplification or weighting of the difference signal by multiplication by corresponding factors. The factors may be chosen depending on various catalyst parameters that may include its temperature, its temperature gradient, an exhaust gas mass flow rate upstream of the SCR catalyst and a nitrogen oxide mass flow rate upstream of the SCR catalyst, and a modeled ammonia mass flow rate downstream of the SCR catalyst. A factor may also be 0 if, for example, an enablement condition is not met and the current difference therefore cannot be included. The weighted result is multiplied by −1 and sent to an integrator 23. The observer thus outputs a simulated area factor $a_{OBDsim}$ that can assume values in the range from 0 to 1. As in the actual diagnosis, as is also the case for the determination of the evaluation time, this area factor $a_{OBDsim}$ is then utilized in order to correct the reaction kinetics model and hence close the observer circuit.

Rather than an evaluation of the area factor for a decision as to the catalyst state as can take place in the diagnosis itself, the area factor $a_{OBDsim}$ thus obtained is compared by a suitable evaluation module 24 (e.g. diagnosis software in a control unit) with a selected threshold value, the attainment of which indicates that the current period of time is sufficient for recognition of the particular catalyst state. The time from which the area factor goes below the threshold (in the case of a modeled BPU catalyst as the second model) or exceeds it (for example in the case of a modeled WPA catalyst as the second model) is thus defined as the evaluation time. Correspondingly, on attainment of the threshold value, the diagnosis can be evaluated directly by the OBD system, for example corresponding diagnosis software, if the method for determination of the evaluation time takes place in parallel to the actual diagnosis and the respective measurements. In this way, an optimal time is found for the evaluation of the diagnosis. Alternatively, the evaluation time found can also be passed on to another unit or stored.

At the start of a new monitoring phase, the simulation model 21 and the area factor are initialized to a value that may correspond, for example, to a catalyst between BPU and WPA. Since the area factor, for example, may be 1 in the case of a WPA catalyst and have a value close to 0 in the case of a BPU catalyst, the value chosen for initialization may, for example, be an initial area factor of 0.6, but likewise any other suitable value.

In order to correctly initialize state parameters that represent the $NH_3$ fill level of the catalyst, it is possible to continuously calculate a further, third catalyst model (initialization model) with this area factor in parallel. In the initialization of the corrected simulation model, the states are then overwritten with those from the initialization model.

Figure 3:
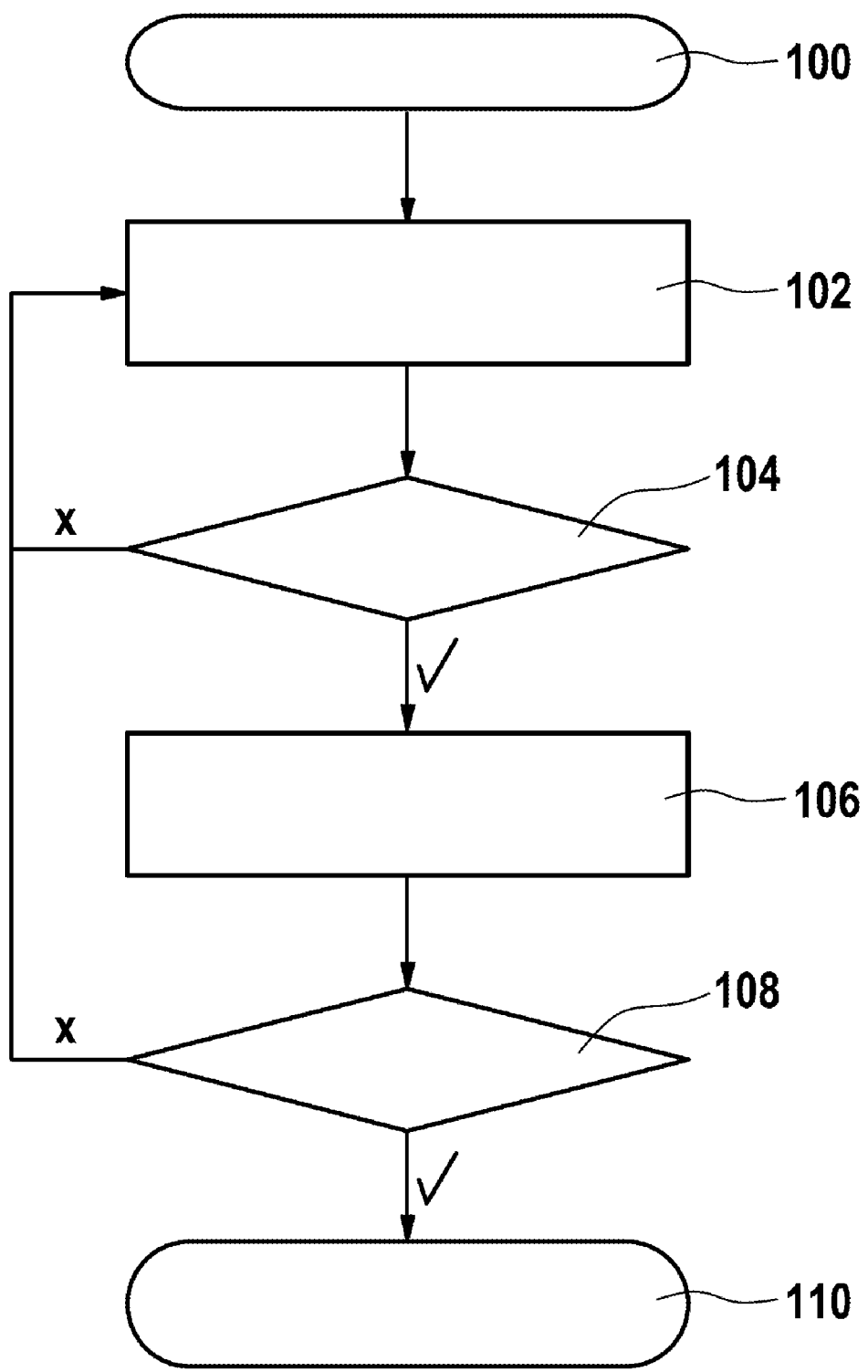
FIG. 3 shows a flow diagram with illustrative method steps for the method from FIG. 2, and FIGS. 4a and 4b show curves for simulated area factors and nitrogen oxide values in a teach-in phase for an illustrative embodiment as in FIG. 2.

FIG. 3 shows the method with these steps by way of example. In step 100, the simulation model 21 and the area factor are firstly initialized. Subsequently, all the models used, i.e. the corrected SCR simulation model 21, the BPU model 20 and the initialization model are updated in step 102.

In step 104, a check is then made on the basis of the enablement conditions as to whether the conditions for a diagnosis are met. If this is the case, in step 106, the simulated area factor $a_{OBDsim}$ is calculated. Otherwise, the models are updated and calculated until the enablement conditions are met.

In step 108, a check is then made as to whether the area factor is below the defined threshold. If not, the models are updated again using this simulated area factor and the next calculation run is started. If the area factor goes below the threshold, the diagnosis evaluation of the actual diagnosis is triggered using the measurements in step 110.

Figure 4A:
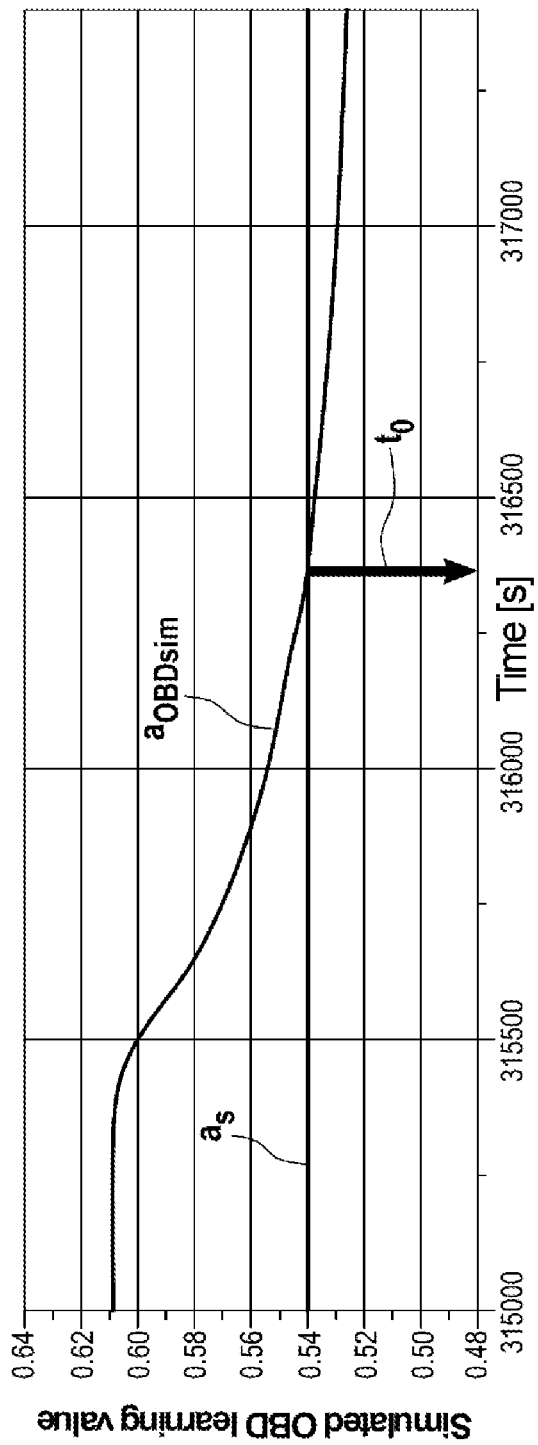
Figure 4B:
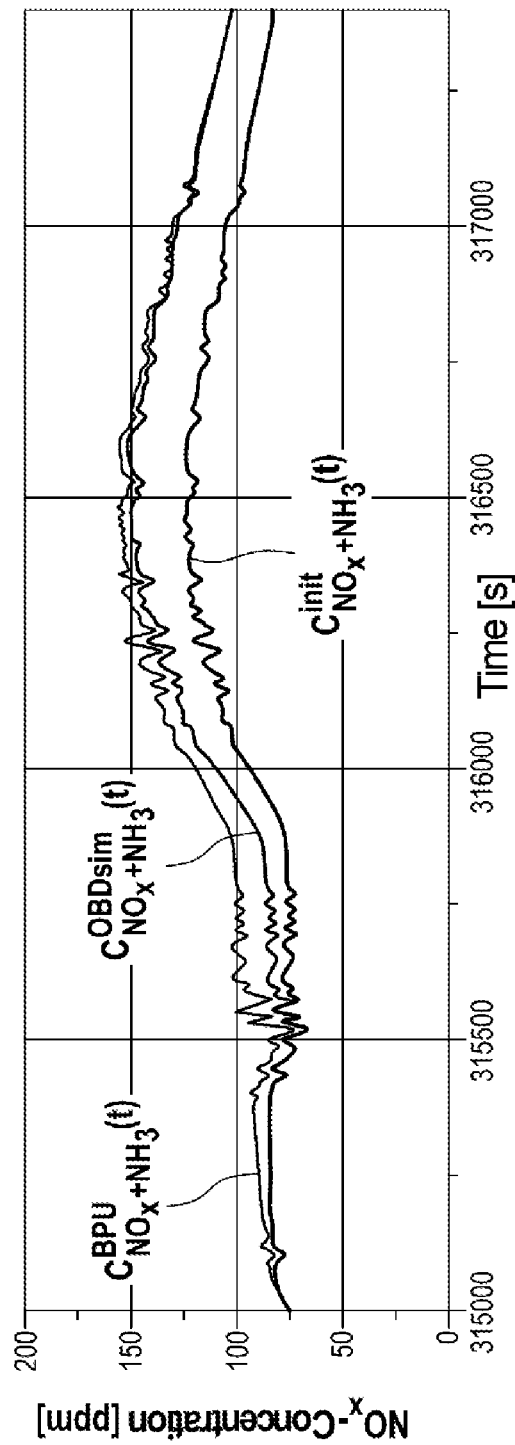

FIG. 4 shows, by way of example, diagrams for a simulated teach-in phase. FIG. 4a shows the simulated area factor $a_{OBDsim}$ plotted against time, while FIG. 4b shows the parallel progression of various modeled NOx sensor values, i.e. the cumulative values for the $NO_x$ and $NH_3$ components from the respective models. The uppermost line in FIG. 4b is the simulated sensor value $c_{NO_xNH_3}^{BPU}(t)$ in the case of a BPU catalyst as the second model, the middle line the simulated $c_{NO_xNH_3}^{OBDsim}(t)$ value from the model simulation corrected by the observer, and the lowermost line the simulated sensor value $c_{NO_xNH_3}^{init}(t)$ of an intermediate catalyst in the initialization model, i.e. with a given initial area factor and without observer correction.

In this example, the corrected model reckons with an initial value for the area factor of $a_{init}$=0.61. At this time, the simulated sensor value shows the same value as the initialization model (lower curve). By the fitting of the area factor $a_{OBDsim}$ that takes place owing to the variance between the two model values, the corrected model (middle curve $c_{NO_xNH_3}^{OBDsim}(t)$) increasingly approaches the BPU model $c_{NO_xNH_3}^{BPU}(t)$ with increasing diagnosis time. By contrast, the area factor $a_{OBDsim}$ become smaller in parallel.

A suitable threshold that could be chosen here for the evaluation would be, for example, a threshold value as for the simulated area factor of $a_{OBDsim}$=0.54, marked by the horizontal line $a_s$ in FIG. 4a. This correspondingly results in a corresponding time or corresponding evaluation period $t_0$, marked by the arrow in the diagram, at which the value goes below the threshold $a_s$. At this time to, the simulated sensor values for the corrected model $c_{NO_xNH_3}^{OBDsim}(t)$ (middle line) and the BPU model $c_{NO_xNH_3}^{BPU}(t)$ have essentially become aligned with one another, which means that, from this time or after this evaluation period, sufficiently reliable recognition of the BPU model is possible in respect of the diagnosis method. The suitable values and threshold values depend here on the actual catalyst properties and especially on the level of damage to the limiting catalyst to be recognized.

Preference is given to using the same enablement conditions as for the actual diagnosis method for the respective methods of determining the suitable starting time.

Furthermore, such a method with a simulated model can be used not just for the determination of the evaluation time, but it is also possible to derive conditions for enablement of the diagnosis therefrom.

For example, on account of a rise in temperature, $NH_3$ can be released from storage in the catalyst. This process may result in greater ammonia slip in the case of an intact catalyst (WPA) than in the case of a faulty catalyst (BPU) in which there is already less $NH_3$ stored. The combined sensor value beyond the catalyst in the case of an intact catalyst would thus possibly be greater than in the case of a faulty catalyst. In the diagnosis method described, a reduced area factor would then be obtained and this would wrongly be considered a sign of reduced storage capacity, and so it possibly leads to the (wrong) diagnosis of a faulty catalyst. This situation can be recognized by comparing the modeled $NH_3$ values since the modeled $NH_3$ slip in the WPA model is then higher than in the case of the BPU model or initialization model, and the diagnosis can correspondingly be stopped or frozen. This is true both of the actual diagnosis of the component and of the simulated diagnosis for determining the evaluation time.

The accuracy of such methods is highly dependent on the accuracy of the modeling of the catalyst used. In order to allow this to influence the diagnosis, it is possible to employ weighting factors on the difference values between measured or simulated and modeled value, which can be varied depending on operating parameters. The weighting factors are determined individually for each run or for each difference value and are multiplied therewith. As a result, it is possible to take greater account of phases having a high expected model accuracy, while phases having lower expected accuracy influence the respective method only to a limited degree, if at all.

Conditions that can be used for these weightings include, for example, general operating conditions such as the enablement of the $NO_x$ sensors and of the dosage modules for the urea/water solution. Furthermore, it is optionally alternatively possible to utilize, for example, the catalyst temperature, the offgas mass flow rate and the $NO_x$ mass flow rate upstream of the catalyst, individually or in combination, for restriction.

For all such conditions, it is possible in the extreme case to temporarily deactivate the observer or integrator or other progressive elements of the diagnosis method and hence "freeze" the diagnosis, i.e. not to allow certain phases with inaccurate modeling to have any influence at all on the diagnosis or determination of the evaluation time, and then to continue the diagnosis phase again.

It is likewise sensible and possible to consider the temperature gradient of the catalyst for the weighting. In the case of high temperature gradients, there is competition between the $NO_x$ reaction and the $NH_3$ desorption in the SCR catalyst, which complicates modeling. In order to take account of this, the current temperature gradient can be compared with a threshold value. If this threshold is exceeded for a particular period, the process or observer can be put back to a previously stored value corresponding, for example, to the value when the threshold for the temperature gradient was first exceeded. In this way, inaccurate phases are not taken into account without completely stopping the diagnosis in the event of any short-lived rise in the temperature gradient.

In a further illustrative embodiment, an expected learning effectiveness of a diagnosis method can be determined, which is then utilized for enablement or triggering of the diagnosis evaluation. It is possible here to determine and evaluate the simulated sensor values. With reference to the diagnosis/simulation method from FIG. 2, it is possible for this purpose to summate or integrate a difference between the BPU model and the corrected simulation model. This integral is expressed in relation to the summated or integrated difference in the sensor values from the BPU model and the initialization model. If the result is subtracted from 1, this gives the proportion by which the area factor has been corrected in the corrected simulation model by the use of the observer:

$$\text{Learning effectiveness} = \frac{\int \left( c_{NO_x+NH_3}^{BPU} - c_{NO_x+NH_3}^{OBD_{sim}} \right)}{\int \left( c_{NO_x+NH_3}^{BPU} - c_{NO_x+NH_3}^{Init} \right)}$$

This learning effectiveness can be used as an enablement condition for the diagnosis, such that the diagnosis is executed only when the expected learning effectiveness is also above a given threshold when the diagnosis is triggered at the respective evaluation time.

Additionally or alternatively, learning effectiveness can also be used directly as an enablement condition, such that the diagnosis is evaluated whenever the learning effectiveness reaches a chosen threshold value.

In the same way as described for the determination of the evaluation time, it is also possible here to replace the BPU catalyst model with a WPA catalyst model, or it is possible to consider both a BPU model and a WPA model separately and hence calculate two values for learning effectiveness. The evaluation can then in turn be executed, for example, when learning effectiveness for both models fulfills a defined condition.

In a further working example of the invention, the diagnosis method used is a simpler method without feedback. Similarly to the first example, it is possible here to use a first model of a catalyst, for example a WPA catalyst or an intermediate catalyst in a state between WPA and BPU, and to calculate nitrogen oxide values and ammonia values beyond the catalyst therefrom. It is likewise possible, again by means of a cross-sensitive nitrogen oxide sensor, to measure combined values for $NH_3$ and $NO_x$ beyond the catalyst. Thereafter, for the actual diagnosis, it is possible to form a difference between measurement and model value for the cumulative nitrogen oxide and ammonia values beyond the catalyst, which however are then not sent to a control or observer as before but integrated over a certain time. The difference values may be adjusted here by further weighting factors, enablement conditions and others in order, for example, to restrict the influence of particular factors or phases during the diagnosis without completely rejecting the diagnosis. After this time has elapsed, the integrator value is compared to a threshold value, which in turn states whether the catalyst is faulty or intact. If the first model used was an intermediate catalyst, the integrator in the case of an intact catalyst will become negative and in the case of a faulty catalyst will move in the positive direction; in this way, it is possible to determine that a positive integrator value after the given evaluation time of the diagnosis states that the catalyst is faulty.

Such a diagnosis method is described in detail in the applicant's patent application DE 10 2019 206873.1 of the same filing date, "Monitoring the state of a catalyst for lowering nitrogen oxide levels by comparing the nitrogen oxide sensor signal with a modeled value", to which reference is made for further details.

It is then possible to further utilize a further embodiment of the invention in order to find the appropriate time for the evaluation of this diagnosis method, i.e. the optimal duration over which the integrated value is formed, and after which the integrator value is compared with the threshold value.

For this purpose, the sensor measurement can be replaced again by a further model value. In this way, a copy of the diagnosis method is effectively simulated using a second model, and a test is conducted as to the time from which the simulated diagnosis result attains a sufficiently shaped result, i.e. the time from when the integrated value is meaningful and permits reliable separation of the two relevant states. It is again possible here, for example, to choose an intermediate model for the first model, and then, for the evaluation time, to simulate a WPA model and/or a BPA model as the second model value in place of the measured sensor value beyond the catalyst. In this way, again, one or more evaluation times are obtained, which can be used as condition for the diagnosis method. This method too may be influenced by further weighting methods and enablement conditions.

Since operating conditions of the component and hence the modeled values as well can change constantly, for instance temperatures in the catalyst or mass flow rates, such a method of determining an appropriate evaluation time can be performed continuously or periodically. The respectively applicable optimal evaluation time may then be passed on directly as a parameter to the ongoing diagnosis method and/or stored and called up in a control unit in an appropriate manner in order to be able to perform both a frequent and discriminating diagnosis at any time. It is likewise possible to perform the method of determining the evaluation time in parallel as already described and, on attainment of the respective threshold values or conditions, to evaluate the diagnosis.

In all embodiments, it is possible to utilize any suitable model for the respective component that is known in principle in the field. The calculation of the at least one modeled exhaust gas measurement may be based, for example, on a reaction kinetics model or a data-based model (e.g. performance map model). It is also possible to find known models in the literature, for example "Unsteady analysis of NO Reduction over Selective Catalyst Reduction—De-NOx-Monolith Catalysts", E Tronconi, A. Cavanna, P. Forzatti, Ind. Eng. Chem. Res 1998, 37, 2341-2349. These models are implementable in modern car engine control devices and model both the $NO_x$ conversion of an SCR catalyst and the $NH_3$ slip.

If, rather than the reaction kinetics model already described, a data-operated model, for example a performance map model, is used for the calculation, the area factor can be obtained by observing and correcting the maximum ammonia storage capacity of the SCR catalyst rather than the surface area. It is also conceivable that the area factor affects multiple parameters. For instance, in the physical model, as well as the surface area, it is also possible to correct the reaction rates. In a performance map model, as well as the maximum storage capacity, it is also possible to correct the nitrogen oxide conversion. The observer value is then converted to the physical parameters via a conversion, especially by means of a characteristic curve. In the case of these alternatives too, it is correspondingly possible to determine the evaluation time using a further simulated model, and then to compare the respective value utilized for model correction with a threshold in the simulation in order to determine the time from which the diagnosis enables a meaningful evaluation.

The invention has been described here by examples in relation to catalysts and specific diagnosis methods, but it can also be employed for determination of evaluation times in any corresponding diagnosis methods, especially learning diagnosis methods. These may be other methods of catalyst diagnosis, and likewise monitoring methods from other sectors that develop over a particular period of time. It will likewise be apparent that the individual parameters mentioned that can influence the models and conditions are merely illustrative and may be replaced by other parameters and conditions that influence the respective processes (for example in the catalyst).

The invention claimed is:
1. A method of determining a suitable evaluation time for a diagnosis method for the diagnosis of an SCR catalyst, wherein the diagnosis method is based on at least one sensor value, measured via a sensor configured to measure exhaust gas values, and in relation to the SCR catalyst and at least one modeled comparative value ($c_{OBDsim}$), wherein the diagnosis method and the method of determining a suitable evaluation time in the diagnosis method are executed in parallel, wherein the method of determining a suitable evaluation time in the diagnosis method comprises:
replacing, in the diagnosis method and via a computer, at least one measured sensor value with a calculated model value ($c^{BPU}$), where the model (20) for the calculation of the model value is a model of the SCR catalyst in a state that is to be recognized by the diagnosis method;
executing (102, 104, 106) the diagnosis method with the calculated model value;
obtaining a result value ($a_{OBDsim}$) of the diagnosis method;
repeating the preceding steps until the result value attains a defined threshold value; and
fixing the suitable evaluation time in the diagnosis method as the time at which the result value has attained the threshold value, and triggering the evaluation of the diagnosis method at the fixed evaluation time.
2. The method according to claim 1, further comprising:
fixing an initial value for the result value of the diagnosis method,
performing the diagnosis method using a model in which the result value is fixed to the initial value to obtain parameters from an initialization model, and
using parameters from the initialization model for the calculation of the modeled comparative value, the calculation of the calculated model value, or both.
3. The method according to claim 1, further comprising the following steps:
calculating at least one modeled comparative value for a given state of a model catalyst;
detecting at least one measured sensor value in the exhaust gas beyond the catalyst;
forming a difference value from the at least one measured sensor value and the at least one modeled comparative value,
forming the result value as an integrated value from the integral of multiple difference values over a predetermined period of time.
4. The method according to claim 3, wherein the at least one measured sensor value and the at least one calculated model value is one of the following: a nitrogen oxide value, an ammonia value, or a combined nitrogen oxide-ammonia value.
5. The method according to claim 3, wherein the at least one sensor value and the at least one calculated model value each specify a concentration or a mass flow rate of an exhaust gas constituent.
6. The method according to claim 1, further comprising the following steps:
calculating at least one modeled comparative value for a given state of a model catalyst (21);
detecting at least one measured sensor value in the exhaust gas beyond the catalyst;
forming a difference value from the at least one measured sensor value and the at least one modeled comparative value,
amplifying the difference value by means of a state observer (22);
forming an integrated value (23) from the integral of multiple difference values over a predetermined period of time to obtain a result value; and feeding the result value ($a_{OBDsim}$) back into the model (21) of the model catalyst to correct the next modeled comparative value.

7. The method according to claim 1, comprising:
verifying an enablement condition for the diagnosis method, and
calculating the result value only when the enablement condition is met.

8. A system comprising:
at least one sensor configured to measure exhaust gas values;
and a computer connected to the sensor and configured to
 determine a suitable evaluation time for a diagnosis method for the diagnosis of an SCR catalyst, wherein the diagnosis method is based on at least one sensor value measured via the at least one sensor and in relation to the SCR catalyst and at least one modeled comparative value ($c_{OBDsim}$), wherein the diagnosis method and the method of determining a suitable evaluation time in the diagnosis method are executed in parallel,
 replace, in the diagnosis method, at least one measured sensor value with a calculated model value ($c^{BPU}$), where the model (20) for the calculation of the model value is a model of the SCR catalyst in a state that is to be recognized by the diagnosis method;
 execute (102, 104, 106) the diagnosis method with the calculated model value;
 obtain a result value ($a_{OBDsim}$) of the diagnosis method;
repeating the preceding steps until the result value attains a defined threshold value; and
fix the suitable evaluation time in the diagnosis method as the time at which the result value has attained the threshold value, and triggering the evaluation of the diagnosis method at the fixed evaluation time.

9. A non-transitory, computer-readable medium containing instructions that when executed on a computer cause the computer to
 determine a suitable evaluation time for a diagnosis method for the diagnosis of an SCR catalyst, wherein the diagnosis method is based on at least one sensor value, measured via at least one sensor configured to measure exhaust gas values, and in relation to the SCR catalyst and at least one modeled comparative value ($c_{OBDsim}$), wherein the diagnosis method and the method of determining a suitable evaluation time in the diagnosis method are executed in parallel,
 replace, in the diagnosis method, at least one measured sensor value with a calculated model value ($c^{BPU}$), where the model (20) for the calculation of the model value is a model of the SCR catalyst in a state that is to be recognized by the diagnosis method;
 execute (102, 104, 106) the diagnosis method with the calculated model value;
 obtain a result value ($a_{OBDsim}$) of the diagnosis method;
 repeating the preceding steps until the result value attains a defined threshold value; and
fix the suitable evaluation time in the diagnosis method as the time at which the result value has attained the threshold value, and triggering the evaluation of the diagnosis method at the fixed evaluation time.

* * * * *